United States Patent
Sun et al.

(10) Patent No.: US 12,526,101 B2
(45) Date of Patent: Jan. 13, 2026

(54) CHANNEL STATE INFORMATION (CSI) FOR NEW RADIO (NR) SIDE-LINKS

(71) Applicant: Apple Inc., Cupertino, CA (US)

(72) Inventors: Haitong Sun, Cupertino, CA (US); Wei Zeng, Saratoga, CA (US); Chunxuan Ye, San Diego, CA (US); Dawei Zhang, Saratoga, CA (US); Yushu Zhang, Beijing (CN); Zhibin Wu, Los Altos, CA (US); Hong He, San Jose, CA (US)

(73) Assignee: APPLE INC., Cupertino, CA (US)

( * ) Notice: Subject to any disclaimer, the term of this patent is extended or adjusted under 35 U.S.C. 154(b) by 398 days.

(21) Appl. No.: 18/125,794

(22) Filed: Mar. 24, 2023

(65) Prior Publication Data

US 2023/0344579 A1  Oct. 26, 2023

Related U.S. Application Data

(60) Provisional application No. 63/363,417, filed on Apr. 22, 2022.

(51) Int. Cl.
*H04L 5/00* (2006.01)

(52) U.S. Cl.
CPC .................................. *H04L 5/0048* (2013.01)

(58) Field of Classification Search
CPC ..................................................... H04L 5/0048
See application file for complete search history.

(56) References Cited

U.S. PATENT DOCUMENTS

| | | | | |
|---|---|---|---|---|
| 2021/0266828 A1* | 8/2021 | Hwang | ................ | H04W 72/23 |
| 2021/0351891 A1* | 11/2021 | Grant | ................... | H04L 1/0009 |
| 2022/0094499 A1* | 3/2022 | Wang | .................... | H04W 76/14 |

FOREIGN PATENT DOCUMENTS

KR   20220084594 A  *  6/2022  ............ G07D 11/50

OTHER PUBLICATIONS

LG Electronics: "Discussion on physical layer structure for NR sidelink", 3GPP TSG RAN WG1 #99; R1-1912586, Nov. 9, 2019; 34 pages.

LG Electronics: "Discussion on physical layer structure for NR sidelink", 3GPP TSG RAN WG1 #97; R1-1907012, May 3, 2019; 25 pages.

Huawei: "Sidelink reference signal design for NR V2X," 3GPP TSG RAN WG1 Meeting #97; R1-1906009, May 3, 2019; 11 pages.

International Search Report and Written Opinion directed to related International Application No. PCT/US2023/017734, mailed on Jul. 14, 2023; 10 pages.

* cited by examiner

*Primary Examiner* — Duc C Ho
(74) *Attorney, Agent, or Firm* — Sterne, Kessler, Goldstein & Fox, P.L.L.C.

(57) ABSTRACT

Aspects are described for a user equipment (UE) comprising a transceiver configured to enable wireless communication with a base station and a second UE, and a processor communicatively coupled to the transceiver. The processor is configured to determine a set of subcarriers from two physical resource blocks (PRBs). The set of subcarriers includes only one subcarrier or more than two subcarriers. The processor is further configured to transmit, using the first set of antenna ports of the transceiver, channel state information reference signals (CSI-RSs) in a set of resource elements (REs) to the second UE. The set of REs occupies the set of subcarriers.

20 Claims, 11 Drawing Sheets

CHANNEL STATE INFORMATION (CSI) FOR NEW RADIO (NR) SIDE-LINKS

CROSS REFERENCES

This application claims the benefit of U.S. Provisional Application No. 63/363,417 filed Apr. 22, 2022, titled "CHANNEL STATE INFORMATION (CSI) FOR NEW RADIO (NR) SIDE-LINKS," the content of which is herein incorporated by reference in its entirety.

BACKGROUND

Field

The described aspects generally relate to a channel state information (CSI) for new radio (NR) side-links.

SUMMARY

Some aspects of this disclosure relate to systems, apparatuses, and methods for implementing a channel state information (CSI) enhancement for new radio (NR) side-links. For example, the systems, the apparatuses, and the methods are provided for implementing a resource enhancement for channel state information reference signal (CSI-RS) transmissions. The resource enhancement can be in forms of additional subcarriers and/or additional symbol durations.

Some aspects of this disclosure relate to a user equipment (UE) comprising a transceiver configured to enable wireless communication with a base station and a second UE, and a processor communicatively coupled to the transceiver. The processor is configured to determine a set of subcarriers from two physical resource blocks (PRBs). The set of subcarriers includes only one subcarrier or more than two subcarriers. The processor is further configured to transmit, using a first set of antenna ports of the transceiver, channel state information reference signals (CSI-RSs) in a set of resource elements (REs) to the second UE. The set of REs occupies the set of subcarriers.

Some aspects of this disclosure relate to a UE comprising a transceiver configured to enable wireless communication with a base station and a second UE, and a processor communicatively coupled to the transceiver. The processor is configured to determine a plurality of symbol durations. The processor is further configured to transmit, using a first set of antenna ports of the transceiver, CSI-RSs in a set of REs to the second UE. The set of REs occupies the plurality of symbol durations.

Some aspects of this disclosure relate to a base station comprising a transceiver configured to enable wireless communication with a UE and a processor communicatively coupled to the transceiver. The processor is configured to generate a configuration message. The configuration message indicates a set of REs for a side-link CSI-RS transmission between the UE and a second UE. The set of REs occupies a set of subcarriers from two PRBs and the set of subcarriers includes only one subcarrier or more than two subcarriers. The processor is further configured to transmit, using the transceiver, the configuration message to the UE.

This Summary is provided merely for the purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
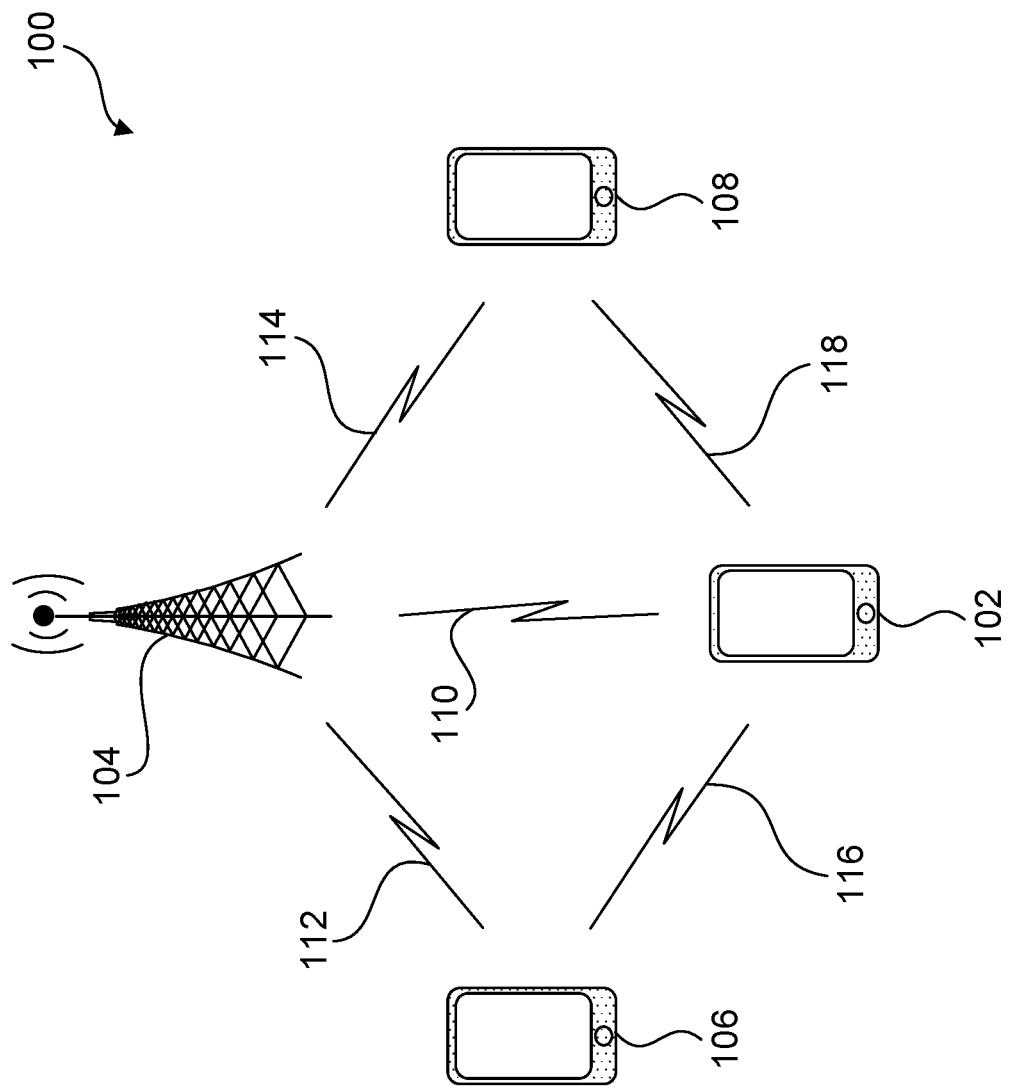
FIG. 1 illustrates an example system implementing a channel state information (CSI) enhancement for new radio (NR) side-links, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a channel state information (CSI) enhancement for new radio (NR) side-links. For example, the systems, the apparatuses, and the methods are provided for implementing a resource enhancement for channel state information reference signal (CSI-RS) transmissions. The resource enhancement can be in forms of additional subcarriers and/or additional symbol durations.

In some aspects, CSI-RSs are used to measure characteristics of radio channels between a base station and a user equipment (UE). For example, the base station transmits CSI-RSs to the UE via radio channels. The UE can perform a measurement of the radio channels based on the received CSI-RSs. The CSI-RSs can also be used to measure characteristics of side-link radio channels between multiple UEs.

For example, the UE can connect with a second UE via the side-link radio channels. The UE can transmit the CSI-RSs to the second UE via the side-link radio channels. The second UE can perform a measurement of the side-link radio channels based on received CSI-RSs.

In some aspects, the UE can include multiple antenna ports. In such a case, the UE can transmit one or more CSI-RSs corresponding to each antenna port to the second UE. The second UE can then measure side-link radio channels corresponding to each of the antenna ports. The UE can also connect with multiple UEs. For example, the UE connects with the second UE and a third UE. The UE transmits CSI-RSs to both the second and the third UEs. The second UE can measure the side-link radio channels between the UE and the second UE. In addition, the third UE can measure side-link radio channels between the UE and the third UE.

In some aspects, the radio resources available for CSI-RS transmissions are limited. This limitation may reduce radio interferences created by the CSI-RS transmissions and experienced by other devices. However, this limitation can be at a cost of radio channel measurement accuracy. To solve this problem, the radio resources for CSI-RS transmissions can be enhanced in the frequency domain and/or in the time domain.

In the frequency domain, conventionally, the UE can transmit the CSI-RS in one resource element (RE) of each physical resource block (PRB). A PRB may include 12 REs, each of which occupies a subcarrier. To enhance the radio resources, the UE can be configured to transmit one or more CSI-RSs in a plurality of REs for each PRB. For example, the UE can be configured to transmit the one or more CSI-RSs in three REs for each PRB. In addition, if the UE includes a first and a second antenna ports, the UE can transmit the one or more CSI-RSs in three REs for each PRB using the first antenna port and transmit the one or more CSI-RSs in three REs for each PRB using the second antenna port. In other words, the UE can use six REs for each PRB to transmit the one or more CSI-RSs. Alternatively, the UE can transmit the CSI-RS using less radio resources. For example, the UE can be configured to transmit the CSI-RS in only one RE for every two PRBs. In such a case, one RE is used for the CSI-RS transmission for every 24 REs. Therefore, at least one additional RE becomes available for other transmissions, such as data transmissions.

In the time domain, the UE can be configured to transmit the CSI-RS repeatedly in multiple consecutive or non-consecutive symbol durations. The symbol durations can be assigned to a single UE, such as the second UE. Therefore, the UE transmits the CSI-RS to the second UE in the multiple symbol durations. In some aspects, multiple UEs can share the multiple symbol durations. In such a case, the UE transmits a combined CSI-RS to the multiple UEs in the multiple symbol durations.

FIG. 1 illustrates an example system 100 implementing a CSI enhancement for NR side-links, according to some aspects of the disclosure. The example system 100 is provided for the purpose of illustration only and does not limit the disclosed aspects. The example system 100 may include, but is not limited to, a UE 102, a UE 106, a UE 108, and a base station 104. The UEs 102, 106, and 108 may be implemented as electronic devices configured to operate based on a wide variety of wireless communication techniques. These techniques may include, but are not limited to, techniques based on 3rd Generation Partnership Project (3GPP) standards. For example, the UEs 102, 106, and 108 may be configured to operate using one or more 3GPP releases, such as Release 15 (Rel-15), Release 16 (Rel-16), Release 17 (Rel-17), or other 3GPP releases. The UEs 102, 106, and 108 may include, but is not limited to, wireless communication devices, smartphones, laptops, desktops, tablets, personal assistants, monitors, televisions, wearable devices, Internet of Things (IoT) devices, vehicle communication devices, and the like. The base station 104 may include one or more nodes configured to operate based on a wide variety of wireless communication techniques such as, but not limited to, techniques based on the 3GPP standards. For example, the base station 104 may include nodes configured to operate using Rel-15, Rel-16, Rel-17, or other 3GPP releases. The base station 104 may include, but not limited to NodeBs, eNodeBs, gNBs, new radio base stations (NR BSs), access points (APs), remote radio heads, relay stations, and others.

In some aspects, the UE 102 connects with the base station 104 via a communication link 110. The communication link 110 can include uplink (UL) connections and downlink (DL) connections. In some aspects, the UE 102 can measure radio channels of the communication link 110 based on a CSI-RS transmission. For example, the base station 104 transmits CSI-RSs to the UE 102 via the DL connections of the communication link 110. The UE 102 can measure the radio channels of the DL connections based on the received CSI-RSs. Furthermore, the communication link 110 can be reciprocal and the UE 102 can assume that radio channels of the UL connections have the same or similar characteristics to the radio channels of the DL connections. Thus, the UE 102 can evaluate radio channels of the UL connections based on the received CSI-RSs as well.

In some aspects, UEs can connect with each other via a base station. For example, the UE 106 and the UE 108 can also connect with the base station 104 via a communication link 112 and a communication link 114 respectively. Therefore, the UE 102 can connect with the UE 106 and/or the UE 108 via the base station 104. For example, the base station 104 can relay information transmitted from the UE 102 to the UE 106 and/or the UE 108.

In some aspects, UEs can also connect with each other directly without a base station. For example, the UE 102 can connect with the UE 106 via a side-link 116 and connect with the UE 108 via a side-link 118. The UE 102 can transmit CSI-RSs to the UE 106 via the side-link 116 and the UE 106 can measure radio channels of the side-link 116 based on the received CSI-RSs. Similarly, the UE 102 can transmit CSI-RSs to the UE 108 via the side-link 118 and the UE 108 can measure the radio channels of the side-link 118 based on the received CSI-RSs.

In some aspects, radio resources for the UE 102 to transmit the CSI-RSs to the UEs 106 and 108 can be limited. For example, the radio resources can be limited to one sub-carrier in each PRB, wherein each of the PRB can include 12 subcarriers. To improve the accuracy of the measurement of the radio channels of the side-links 116 and 118, the UE 102 can enhance the CSI-RSs transmissions by increasing a number of subcarriers used to transmit the CSI-RSs in each PRB. For example, the UE 102 can transmit the CSI-RSs to the UE 106 and the UE 108 using three subcarriers in each PRB. Such an enhancement can be configured by a base station. For example, the base station 104 can transmit a configuration message to the UEs 102, 106, and 108, via the communication links 110, 112, and 114 respectively, indicating additional subcarriers to be used for CSI-RSs transmissions. The base station 104 can also transmit the configuration message indirectly to the UEs 106 and 108 via the UE 102. In some aspects, the UE 102 can determine the enhancement regarding the additional subcarriers independently without receiving the configuration message from the base station 104. In such a case, the UE 102 can generate a side-link configuration message and transmit the side-link configuration message to the UEs 106 and 108 via the side-links 116 and 118.

In some aspects, the enhancement can be in the time domain. For example, the UE 102 transmits the CSI-RSs to the UEs 106 and 108 in a plurality of consecutive or non-consecutive symbol durations. Similar to the additional subcarriers, the plurality of symbol durations can be configured by the configuration message transmitted by the base station 104 or determined by the UE 102 independently.

In some aspects, the UE 102 can include one or more antenna ports. For example, the UE 102 can include a first antenna port and a second antenna port. The configuration message transmitted by the base station 104 can indicate a first set of subcarriers corresponding to the first antenna port and a second set of subcarriers corresponding to the second antenna port. In such a case, the UE 102 transmits the CSI-RSs in the first set of subcarriers using the first antenna port and transmits the CSI-RSs in the second set of subcarriers using the second antenna port. In some aspects, the UE 102 can include a first set of antenna ports and a second set of antenna ports, wherein the first set and the second set can each include one or more antenna ports. In such a case, the configuration message can indicate that the UE 102 transmits the CSI-RSs in the first set of subcarriers using the first set of antenna ports and transmits the CSI-RSs in the second set of subcarriers using the second set of antenna ports. It is worth noting that when a UE, such as the UE 102, is described in this disclosure to transmit or receive using the first and/or the second antenna ports, the UE 102 can transmit or receive using the first and/or the second sets of antenna ports instead if the UE 102 includes the first and/or the second sets of antenna ports.

Figure 2:
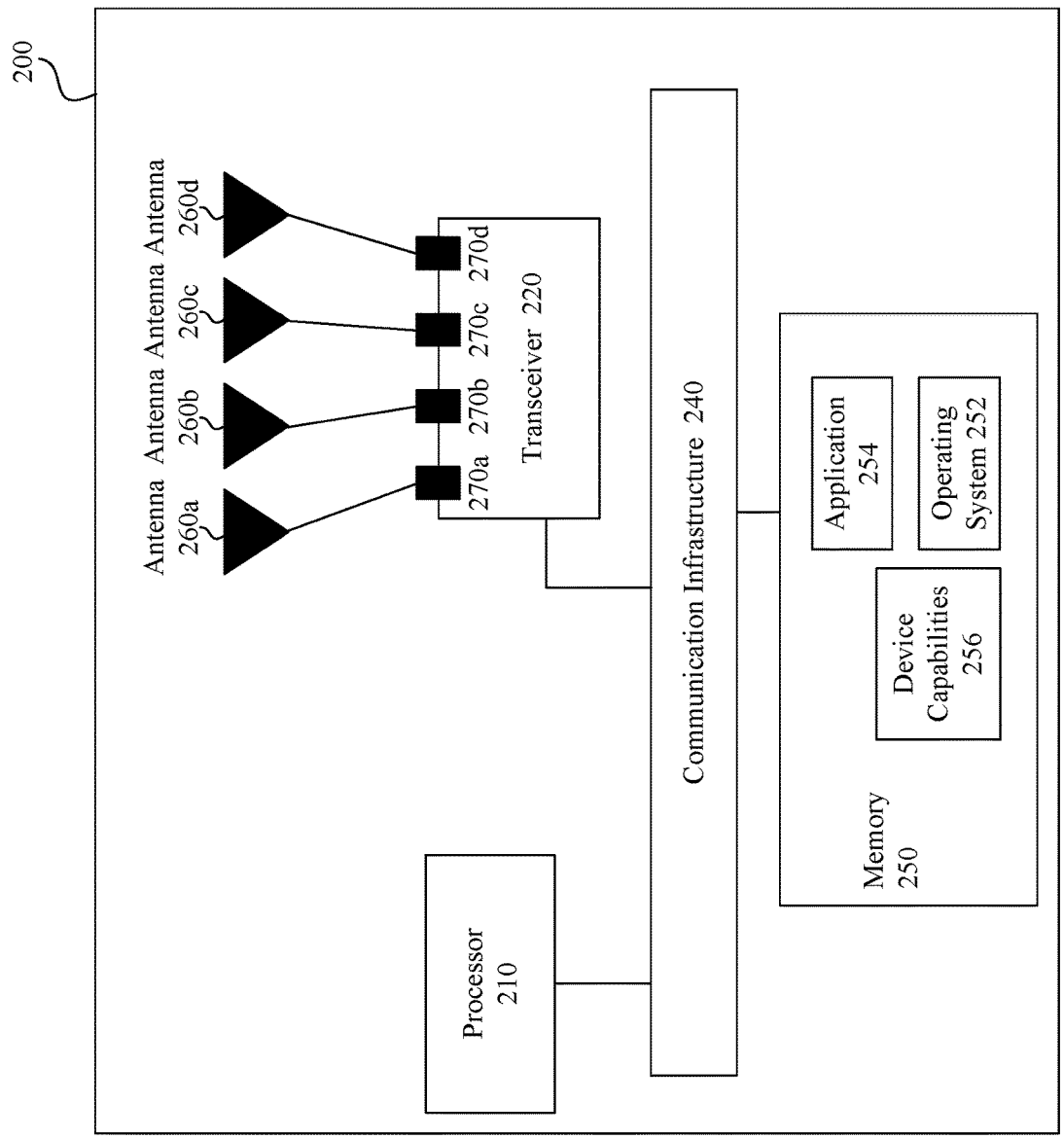
FIG. 2 illustrates a block diagram of an example system of an electronic device for the CSI enhancement, according to some aspects of the disclosure.

FIG. 2 illustrates a block diagram of an electronic device 200 implementing the CSI enhancement for the NR side-links, according to some aspects of the disclosure. The electronic device 200 may be any of the electronic devices (e.g., the UEs 102, 106, 108, and the base station 104) of the system 100. The electronic device 200 includes a processor 210, one or more transceivers 220, a communication infrastructure 240, a memory 250, an operating system 252, an application 254, device capabilities 256, and antennas 260a, 260b, 260c and 260d. Illustrated systems are provided as exemplary parts of electronic device 200, and electronic device 200 may include other circuit(s) and subsystem(s). Also, although the systems of electronic device 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by electronic device 200 and/or a user of electronic device 200. The applications in the application 254 may include applications such as, but not limited to radio streaming, video streaming, remote control, and/or other user applications. In some aspects, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for the side-link CSI enhancement, as described herein. Alternatively, or additionally, the processor 210 can be "hard coded" to implement mechanisms for the side-link CSI enhancement, as described herein.

The one or more transceivers 220 transmit and receive communications signals support mechanisms for the side-link CSI enhancement. Additionally, the one or more transceivers 220 transmit and receive communications signals that support mechanisms for measuring communication link(s), generating and transmitting system information, and receiving the system information. According to some aspects, the one or more transceivers 220 may be coupled to the antennas 260a, 260b, 260c and 260d to wirelessly transmit and receive the communication signals. The antennas 260a, 260b, 260c and 260d may include one or more antennas that may be the same or different types. The one or more transceivers 220 allow electronic device 200 to communicate with other devices that may be wired and/or wireless. The antennas 260a, 260b, 260c and 260d can correspond to one or more antenna ports, such as antenna ports 270a, 270b, 270c, and 270d. Antenna ports, such as the antenna ports 270a, 270b, 270c, and 270d, can also correspond to one or more antennas. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-11, processor 210 may implement different mechanisms for the side-link CSI enhancement as discussed with respect to the system 100 of FIG. 1.

Figure 3:
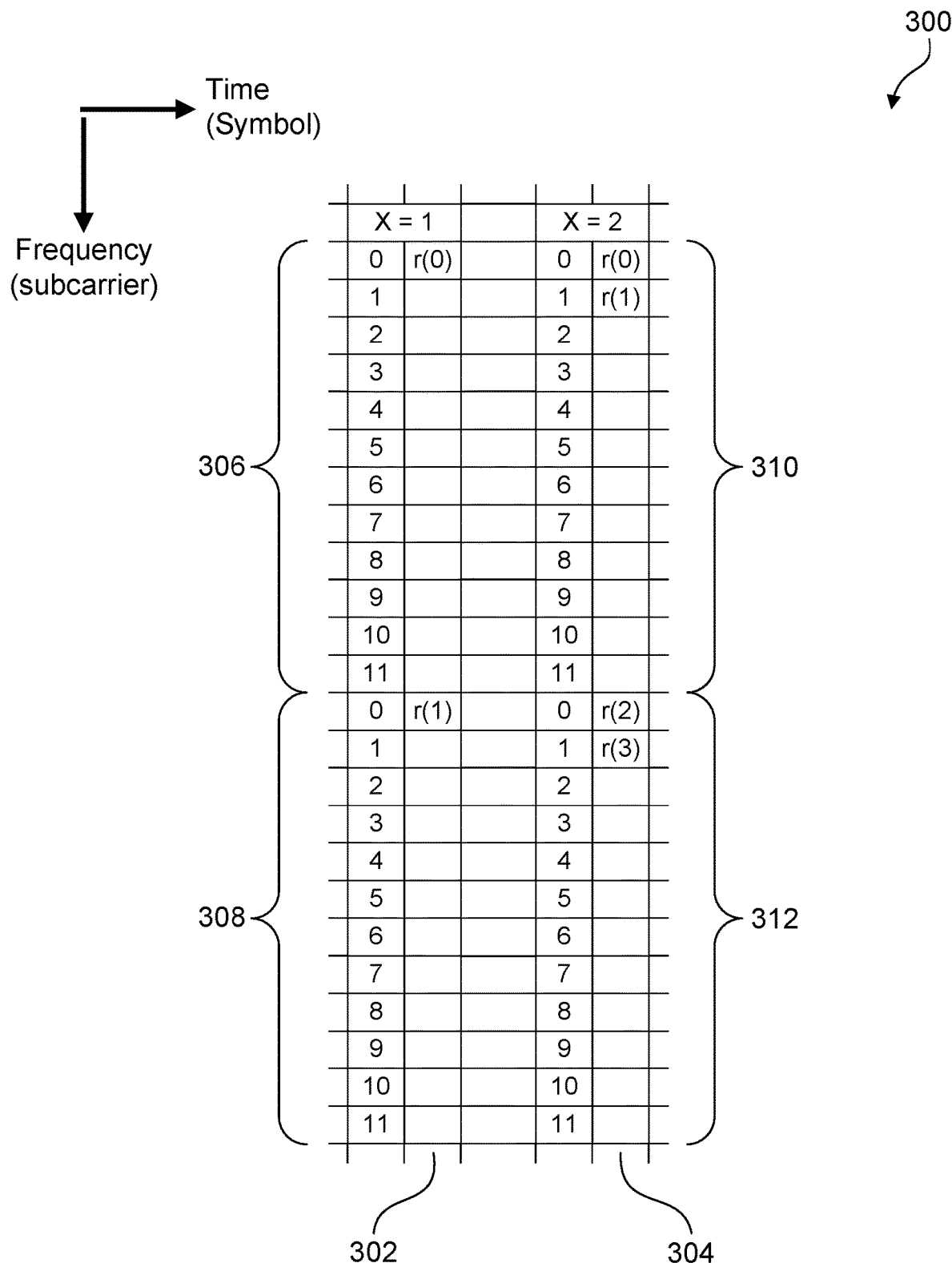
FIG. 3 illustrates an example of a side-link resource assignment in the frequency domain, according to aspects of the disclosure.

FIG. 3 illustrates an example 300 of a side-link resource assignment in the frequency domain. The example 300 is provided for the purpose of illustration only and does not limit the disclosed aspects. The example 300 includes subcarrier assignments 302 and 304 in one symbol duration. The base station 104 generates the subcarrier assignments 302 and/or 304, and transmits them to the UE 102 via the communication link 110.

In some aspects, the UE 102 can include one antenna port, such as the first antenna port. In such a case, the UE 102 transmits the CSI-RSs using the first antenna port based on the subcarrier assignment 302 received from the base station 104. In some aspects, the UE 102 can include two antenna ports, such as the first and the second antenna ports. In such a case, the UE 102 transmits the CSI-RSs using the first and the second antenna ports based on the subcarrier assignment 304 received from the base station 104.

In some aspects, the subcarrier assignment 302 includes one or more PRBs, such as PRBs 306 and 308, each of which includes 12 resource elements (REs). The subcarrier assignment 302 assigns RE r(0) of the PRB 306 and RE r(1) of the PRB 308 to the CSI-RSs transmission. Therefore, the UE 102 transmits the CSI-RSs in the REs r(0) and r(1) using the first antenna port. The subcarrier assignment 302 illustrates an example of a location of a RE that is assigned to the first antenna port of the UE 102 and is not limited to the PRBs 306 and 308. For example, the subcarrier assignment 302 can indicate that the first RE of a PRB is assigned to the first antenna port of the UE 102 for the CSI-RS transmission and the UE 102 can transmit the CSI-RSs in the first subcarriers of every PRB.

In some aspects, the base station 104 can generate a configuration message that indicates the subcarrier assignment 302 and transmit the configuration message to the UE 102 via the communication link 110. For example, the configuration message can include a frequency allocation parameter, such as a frequencyDomainAllocation parameter, that indicates a location of a RE in each PRB. The configuration message can also include a time domain parameter, such as a firstOFDMSymbolInTimeDomain parameter, that indicates a symbol duration for assigned REs, such as the REs r(0) and r(1) of the subcarrier assignment 302. In some aspects, the UE 102 transmits the CSI-RSs to the UE 106 in the REs r(0) and r(1). Thus, the UE 106 may be required to have information regarding the REs r(0) and r(1) to receive the CSI-RSs. In some aspects, the UE 106 can determine the REs r(0) and r(1) based on the configuration message received. For example, the base station 104 can transmit the configuration message directly to the UE 106 via the communication link 112. The base station 104 can also transmit the configuration message indirectly to the UE 106 via the UE 102. In some aspects, the UE 102 can also determine the subcarrier assignment 302 independently without receiving the configuration message from the base station 104. For example, the UE 102 can determine the subcarrier assignment 302 based on data to be transmitted, current or past radio channel conditions of the side-link 116, or other information available to the UE 102. In such a case, the UE 106 receives the configuration message directly from the UE 102.

In some aspects, the subcarrier assignment 304 includes one or more PRBs, each of which includes 12 REs. As shown in FIG. 3, the subcarrier assignment 304 assigns REs r(0) and r(1) of a PRB 310 and REs r(2) and r(3) of a PRB 312 for the CSI-RSs transmission. In such a case, the UE 102 transmits the CSI-RSs in the REs r(0) and r(2) using the first antenna port, and transmits the CSI-RSs in the REs r(1) and r(3) using the second antenna port. In some aspects, the subcarrier assignment 304 illustrates an example of positions of REs assigned to the first antenna port and the second antenna port of the UE 102 and is not limited to the PRBs 310 and 312. For example, the subcarrier assignment 304 can indicate that the first RE of each PRB is assigned to the first antenna port of the UE 102 and the second RE of each PRB is assigned to the second antenna port of the UE 102.

In some aspects, a first and a second orthogonal cover codes (OCCs) can be assigned to the first and the second antenna ports respectively to further distinguish the CSI-RSs transmitted using the first and the second antenna port, in addition to the different REs. In such a case, the CSI-RSs are encoded by the first OCC and transmitted using the first antenna port and the CSI-RSs are encoded by the second OCC and transmitted using the second antenna port. In some aspects, the first and the second antenna ports can share the assigned REs, such as the REs r(0) and r(1) of the PRB 310 and the REs r(2) and r(3) of the PRB 312. The CSI-RSs encoded by the first OCC and the second OCC can be combined and transmitted in all the assigned REs using both the first and the second antenna ports. On the other side, receiving UEs, such as the UEs 106 and 108, can decode the CSI-RSs using the first OCC and/or the second OCC.

In some aspects, the configuration message can also indicate the subcarrier assignment 304. For example, the configuration message can include the frequency allocation parameter, such as the frequencyDomainAllocation parameter, which indicates a location of a RE in each PRB. The REs assigned to the first and second antenna ports are two consecutive REs in each PRB. In the case of the subcarrier assignment 304, the frequency allocation parameter can indicate the location to be the first RE in each PRB. Therefore, the UE 102, when receiving the configuration message, can determine that the first RE of each PRB is assigned to the first antenna port and the second RE of each PRB is assigned to the second antenna port. In some aspects, the UE 102 transmits the CSI-RSs to another UE, such as the UE 106. Thus, the UE 106 may be required to have information regarding the REs r(0), r(1), r(2), and r(3) to receive the CSI-RSs. In some aspects, the UE 106 can determine the REs r(0), r(1), r(2), and r(3) based on the configuration message received. For example, the base station 104 can transmit the configuration message directly to the UE 106 via the communication link 112. The base station 104 can also transmit the configuration message indirectly to the UE 106 via the UE 102. In some aspects, the UE 102 can also determine the subcarrier assignment 304 independently without receiving the configuration message from the base station 104. For example, the UE 102 can determine the subcarrier assignment 304 based on data to be transmitted, current or past radio channel conditions of the side-link 116, or other information available to the UE 102. In such a case, the UE 106 receives the configuration message directly from the UE 102.

Figure 4:
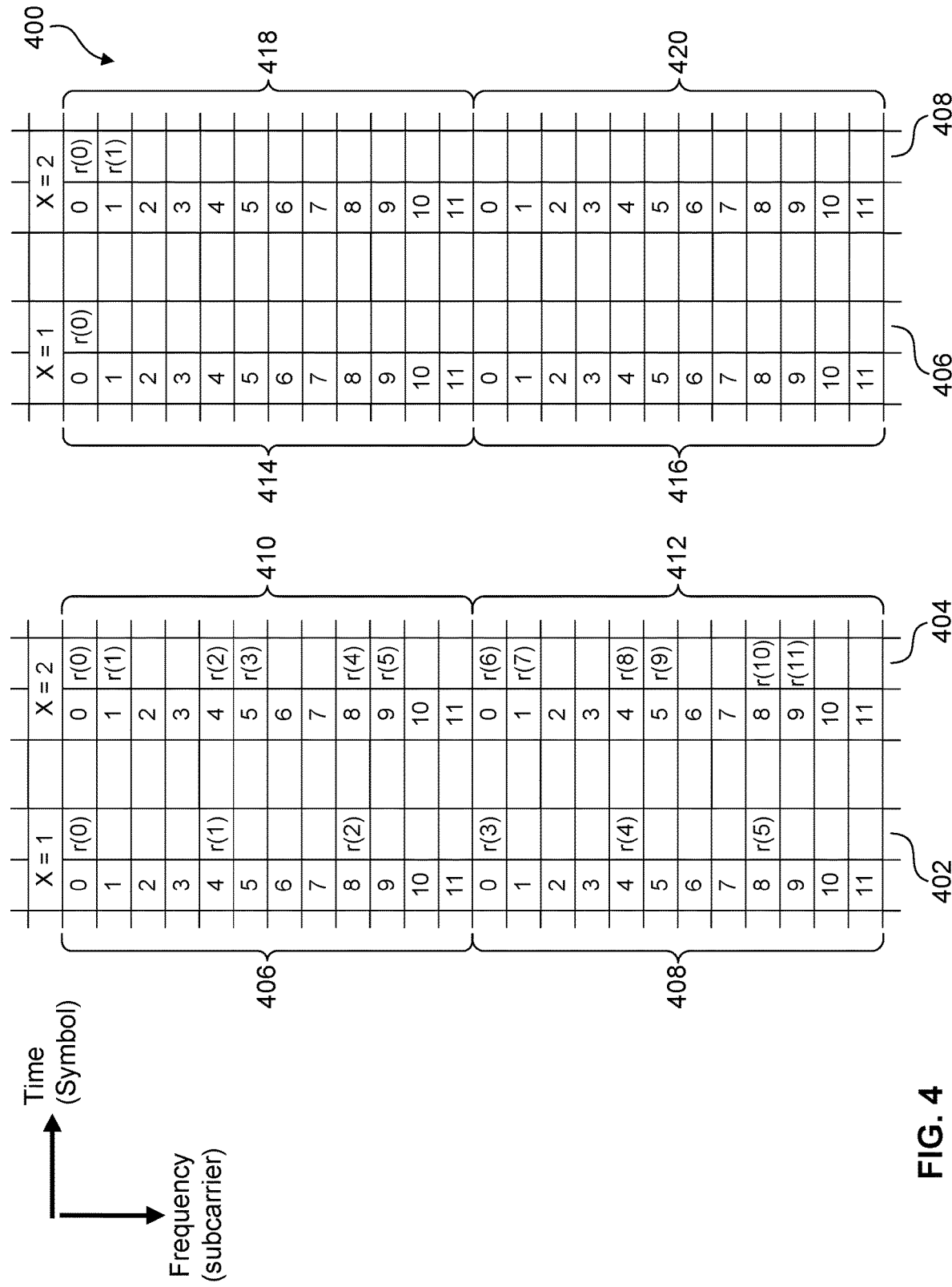
FIG. 4 illustrates an example of an enhanced side-link resource assignment in the frequency domain, according to aspects of the disclosure.

FIG. 4 illustrates an example 400 of an enhanced side-link resource assignment in the frequency domain. The example 400 is provided for the purpose of illustration only and does not limit the disclosed aspects. The example 400 includes subcarrier assignments 402, 404, 406, and 408 in one symbol duration. The base station 104 can generate a configuration message that indicates the subcarrier assignments 402, 404, 406, and/or 408, and transmits it to the UE 102 via the communication link 110. In some aspects, the UE 102 can include one antenna port, such as the first antenna port. In such a case, the UE 102 transmits the CSI-RSs using the first antenna port based on the subcarrier assignments 402 or 406. In some aspects, the UE 102 can include two antenna ports, such as the first and the second antenna ports. In such a case, the UE 102 transmits the CSI-RSs using the first and the second antenna ports based on the subcarrier assignments 404 or 408.

In some aspects, the subcarrier assignment 402 indicates that REs r(0), r(1), and r(2) of a PRB 406 and REs r(3), r(4), and r(5) of a PRB 408 are assigned to the first antenna port of the UE 102. In other words, three REs of each PRB are assigned to one antenna port. The subcarrier assignment 402 can be referred to as having a density of 3. Compared with the subcarrier assignment 302, additional REs assigned, such as the REs r(1) and r(2) of the PRB 406, improve the accuracy of radio channel measurements. In some aspects, the configuration message generated by the base station 104 can indicate the subcarrier assignment 402 using frequency allocation parameters. For example, the frequency allocation parameters can indicate the first RE, the fifth RE, and the ninth RE of each PRB.

In some aspects, the subcarrier assignment 404 can indicate that REs r(0), r(2), and r(4) of a PRB 410 and REs r(6), r(8), and r(10) of a PRB 412 are assigned to the first antenna port of the UE 102. Similarly, the subcarrier assignment 404 can also indicate that REs r(1), r(3), and r(5) of the PRB 410 and REs r(7), r(9), and r(11) of the PRB 412 are assigned to the second antenna port of the UE 102. In such a case, three REs of each PRB are assigned to each of the first and second antenna ports and the subcarrier assignment 404 can also be referred to as having a density of 3. In some aspects, the configuration message can indicate the subcarrier assignment 404 using the frequency allocation parameters. For example, the frequency allocation parameters can indicate that the first RE, the fifth RE, and the ninth RE of each PRB are assigned to the first antenna port. Because the REs assigned to the first and second antenna ports are assigned in pairs and the REs of the second antenna port follow the REs of the first antenna port, the frequency allocation parameters equivalently indicate that the second RE, the sixth RE, and the tenth RE of each PRB are assigned to the second antenna port.

In some aspects, a first and a second OCCs are assigned to the first and second antenna ports to further distinguish the CSI-RSs transmitted using the first and second antenna ports, as similarly described in FIG. 3. The first and the second OCCs can also be used to enable the first and the second antenna ports to share assigned REs, as similarly described in FIG. 3.

In some aspects, the subcarrier assignment 406 indicates that a RE r(0) of a PRB 414 is assigned to the first antenna port of the UE 102. In such a case, only one RE of every two PRBs, such as the PRBs 414 and 416, is assigned to the first antenna port. The subcarrier assignment 406 can also be referred to as having a density of 0.5. Compared to the subcarrier assignment 302 of FIG. 3, an additional RE, such as the RE r(1) of the PRB 308, becomes available for data transmissions. This improves the efficiency of side-links, such as the side-links 116 and 118 of FIG. 1. In some aspects, the configuration message can indicate the subcarrier assignment 406 using a density parameter and a frequency allocation parameter. For example, the density parameter can be 0.5, which indicates that one RE is assigned to the first antenna port of the UE 102 in every two PRBs, such as the PRBs 414 and 416. The density parameter can also be other numbers, such as 0.25. In such a case, one RE in every four PRBs is assigned to the first antenna of the UE 102. The frequency allocation parameter, on the other hand, indicates a position of the RE assigned, such as the first RE of the PRB 414.

In some aspects, the subcarrier assignment 408 indicates that RE r(0) of a PRB 418 is assigned to the first antenna port of the UE 102 and RE r(1) of the PRB 418 is assigned to the second antenna port of the UE 102. In such a case, one RE of every two PRBs, such as the PRB 418 and a PRB 420, is assigned to one antenna port and the subcarrier assignment 408 can also be referred to as having a density of 0.5. In some aspects, the configuration message can indicate the subcarrier assignment 408 using a density parameter and a frequency allocation parameter similarly as discussed above.

In some aspects, the first and the second antenna ports can share assigned REs, such as the REs r(0) and r(1) of the subcarrier assignment 408. In such a case, a first and a second OCCs are assigned to the first and second antenna ports respectively to further distinguish the CSI-RSs transmitted using the first and second antenna ports, as similarly described in FIG. 3. Therefore, the first and the second OCCs can enable the first and the second antenna ports to share the assigned REs, as similarly described in FIG. 3.

In some aspects, the UE 102 transmits the CSI-RSs to other UEs, such as the UE 106 and/or UE 108, based on a subcarrier assignment, such as the subcarrier assignments 402, 404, 406, or 408. Therefore, the other UEs may be required to have information of the subcarrier assignments to receive the CSI-RSs in corresponding REs. The base station 106 can transmit the configuration message indicating the subcarrier assignment to the other UEs directly or indirectly. For example, the base station 104 can transmit the configuration message directly to the UE 106 via the communication link 112 and/or to the UE 108 via the communication link 114. The base station 104 can also transmit the configuration message to the UE 102 via the communication link 110. The UE 102 can then forward the configuration message to the UE 106 via the side-link 116 and to the UE 108 via the side-link 118.

In summary, the subcarrier assignments 402 and 404 increase a number of REs in every two PRBs assigned to an antenna port. Whereas, the subcarrier assignments 406 and 408 decreases the number REs in every two PRBs assigned to the antenna port. Based on these subcarrier assignments, the UE 102 transmits the CSI-RSs in only one subcarrier or more than two subcarriers of every two PRBs according to the embodiments described herein.

Figure 5:
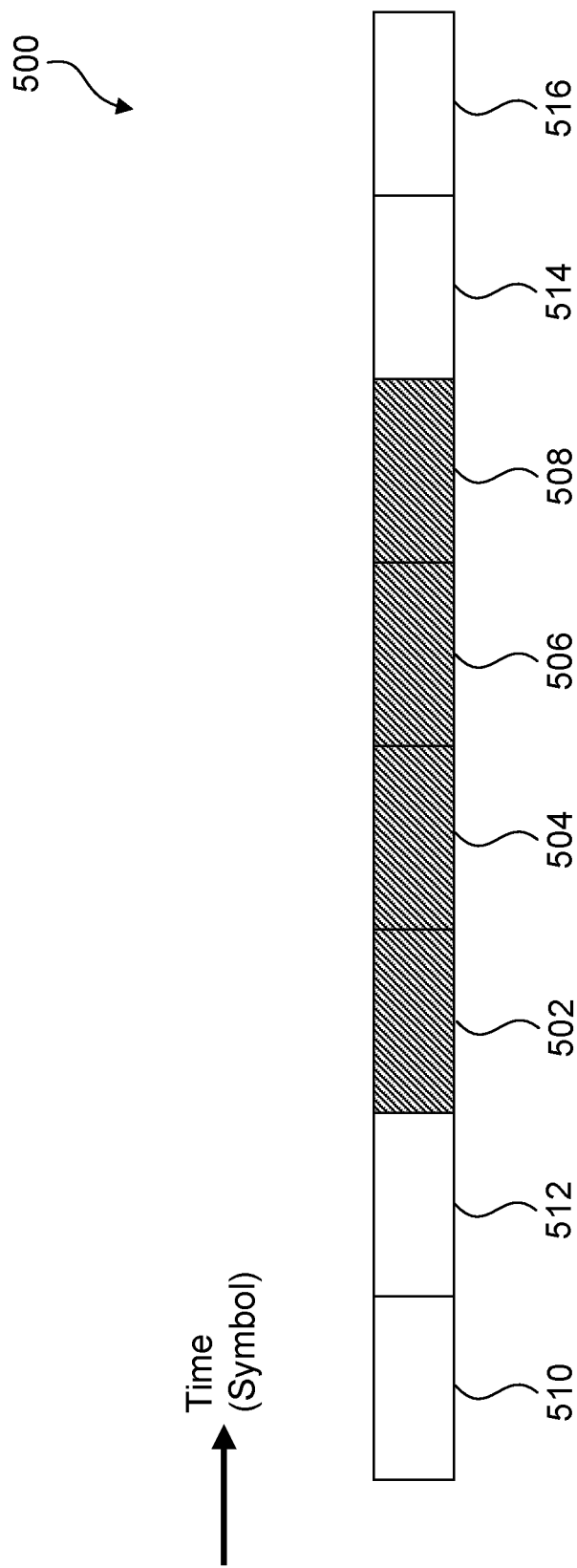
FIG. 5 illustrates an example of the enhanced side-link resource assignment in consecutive symbol durations, according to aspects of the disclosure.

FIG. 5 illustrates an example 500 of the enhanced side-link resource assignment in consecutive symbol durations. The example 500 is provided for the purpose of illustration only and does not limit the disclosed aspects. The example 500 includes a plurality of symbol durations, such as OFDM symbol durations. In some aspects, the plurality of symbol durations are within a slot. For example, the time domain of radio transmissions can be structured by frames. Each frame may have a duration of 10 ms and includes one or more sub-frames. Each sub-frame includes one or more slots. Each slot includes one or more symbol durations, such as symbol durations 502, 504, 506, 508, 510, 512, 514, and 516 of FIG. 5.

In some aspects, the symbol durations 502, 504, 506, and 508 are assigned for the CSI-RSs transmission, while the symbol durations 510, 512, 514, and 516 are not assigned for the CSI-RS transmission. The UE 102 can transmit the CSI-RSs repeatedly in the consecutive symbol durations 502, 504, 506, and 508 to the UE 106 and/or the UE 108. Repeat CSI-RSs transmissions can improve the accuracy of the measurement of radio channels of the side-links 116 and/or 118. In some aspects, the symbol durations 502, 504, 506, and 508 are assigned by a base station, such as the base station 104. The base station 104 generates a configuration message that indicates the symbol durations 502, 504, 506, and 508. For example, the configuration message can include a symbol time parameter, such as a firstOFDMSymbolInTimeDomain parameter, and a repeat number. The symbol time parameter indicates the first assigned symbol duration, such as the symbol duration 502. The repeat number indicates the number of symbol durations the CSI-RSs transmission is repeated in, such as four as shown in FIG. 5. The base station 104 can transmit the configuration message to the UE 102 via the communication link 110. The base station 104 can also transmit the configuration message, directly or indirectly through the UE 102, to other UEs that receive the CSI-RSs transmission, such as the UE 106 and/or the UE 108.

In some aspects, the symbol durations 502, 504, 506, and 508 are assigned to one antenna port of a UE, such as the first antenna port or second antenna port of the UE 102. Therefore, the UE 102 transmits the CSI-RSs repeatedly in the symbol durations 502, 504, 506, and 508 using one of the first or the second antenna ports of the UE 102. In other aspects, the symbol durations 502, 504, 506, and 508 are assigned to multiple antenna ports, such as the first antenna port and second antenna port of the UE 102. The UE 102 transmits the CSI-RSs in these symbol durations using both the first and the second antenna ports. In such a case, the CSI-RSs can include a first CSI-RS corresponding to the first antenna port and a second CSI-RS corresponding to the second antenna port. To distinguish the CSI-RSs of the first and second antenna ports, the CSI-RSs are encoded by OCCs, such as Hadamard codes. For example, a first OCC is assigned to the first antenna port and a second OCC is assigned to the second antenna port. The UE 102 encodes the first CSI-RS using the first OCC and encodes the second CSI-RS using the second OCC. The UE 102 then combines the encoded first and second CSI-RSs to be a combined CSI-RS and transmits it using both the first antenna port and the second antenna port in each of the symbol durations 502, 504, 506, and 508. A receiving UE, such as the UE 106, can decode the first and the second CSI-RSs using the first and second OCCs. For example, the receiving UE can obtain the received first CSI-RS by multiplying the first OCC with the received combined CSI-RS. Because the first and the second OCCs are orthogonal to each other, the second CSI-RS, which is encoded by the second OCC, is cancelled out. In a similar manner, the receiving UE can obtain the received second CSI-RS by multiplying the second OCC with the received combined CSI-RS. The receiving UE can then measure radio channels corresponding to the first and the second antenna ports using the received first and second CSI-RSs respectively. In some aspects, the receiving UE is configured by a base station regarding the OCCs. For example, the configuration message generated by the base station 104 includes OCC configuration that indicates one or more OCCs and corresponding antenna ports. The base station 104 transmits the configuration message to the receiving UE, such as the UE 106. It is worth noting that the number of antenna ports and corresponding OCCs are not limited to two. For example, the UE 102 can have four antenna ports. The UE 102 can encode four CSI-RSs with four OCCs and generate the combined CSI-RS. Similarly, the receiving UE can obtain four received CSI-RSs by multiplying corresponding OCCs. Further, the present disclosure is not limited to 1, 2, or 4 antenna ports.

In some aspects, the symbol durations 502, 504, 506, and 508 can be shared by multiple UEs. For example, the UE 102 transmits the CSI-RSs in these symbol durations to both the UE 106 and the UE 108. In some aspects, the CSI-RSs can include a first CSI-RS corresponding to the UE 106 and a second CSI-RS corresponding to the UE 108. To distinguish the CSI-RSs of the UEs 106 and 108, the CSI-RSs are encoded by OCCs. For example, a first OCC is assigned to the UE 106 and a second OCC is assigned to the UE 108. The UE 102 encodes the first CSI-RS using the first OCC and encodes the second CSI-RS using the second OCC. The UE 102 combines the encoded first and second CSI-RSs to be a combined CSI-RS and transmits it to both the UEs 106 and 108 in each of the symbol durations 502, 504, 506, and 508. The UE 106 can obtain the received first CSI-RS by multiplying the first OCC with the received combined CSI-RS and measure radio channels of the side-link 116 using the received first CSI-RS. The UE 108 can similarly obtain the received second CSI-RS by multiplying the second OCC with the received combined CSI-RS and measure radio channels of the side-link 118 using the received second CSI-RS. In some aspects, the UEs 106 and 108 are configured by a base station regarding the OCCs. For example, the configuration message generated by the base station 104 includes OCC configuration that indicates one or more OCCs and corresponding UEs. For example, the configuration message can indicate that the first OCC corresponds to the UE 106 and the second OCC corresponds to the UE 108. The base station 104 then transmits the configuration message to the UEs 106 and 108. It is worth noting that the number of UEs that can share the symbol durations is not limited to two. For example, the UE 102 can transmit the CSI-RSs to four UEs. The UE 102 can encode four CSI-RSs with four OCCs and generate the combined CSI-RS. Similarly, each of the four UEs can obtain its corresponding CSI-RS received by multiplying its corresponding OCC.

In some aspects, the symbol durations 502, 504, 506, and 508 belong to two consecutive slots. For example, the symbol durations 502 and 504 belong to a first slot and the symbol durations 506 and 508 belong to a second slot. The UE 102 can transmit the CSI-RSs in all assigned symbol durations, such as the symbol durations 502, 504, 506, and 508. On the other hand, the UE 102 can refrain from transmitting in the second slot. For example, the UE 102 transmits the CSI-RSs in the symbol durations 502 and 504, but not in the symbol durations 506 and 508.

In some aspects, the repeated transmission in the symbol durations 502, 504, 506, and 508 can be combined with the subcarrier assignments 402, 404, 406, and 408. For example, the UE 102 can transmit in a set of REs using the first antenna port, wherein the set of REs occupies six subcarriers of the PRBs 406 and 408 in the frequency domain as shown in the subcarrier assignment 402 of FIG. 4 and occupies the symbol durations 502, 504, 506, and 508 in the time domain as shown in FIG. 5.

Figure 6:
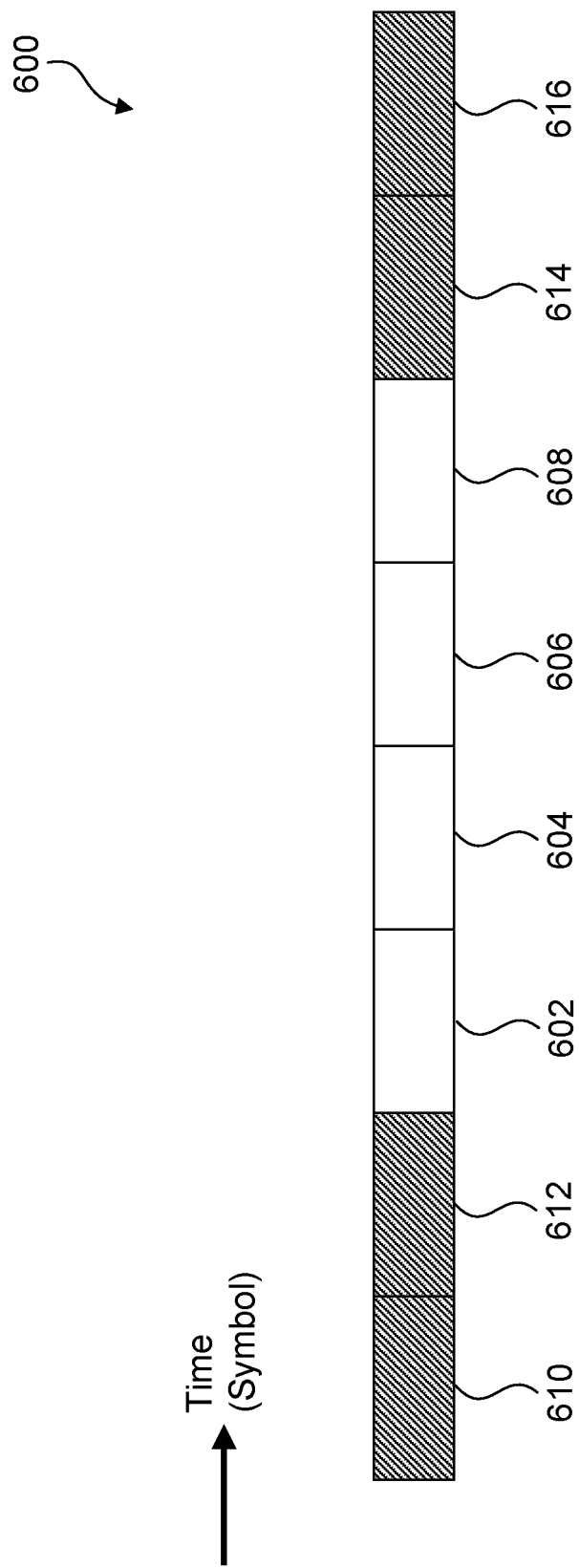
FIG. 6 illustrates an example of the enhanced side-link resource assignment in non-consecutive symbol durations, according to aspects of the disclosure.

FIG. 6 illustrates an example 600 of the enhanced side-link resource assignment in non-consecutive symbol durations. The example 600 is provided for the purpose of illustration only and does not limit the disclosed aspects. The example 600 includes a plurality of symbol durations, such as symbol durations 602, 604, 606, 608, 610, 612, 614, and 616.

In some aspects, the symbol durations 610, 612, 614, and 616 are assigned for the CSI-RSs transmission. These assigned symbol durations are in two non-consecutive segments. A first segment includes the symbol durations 610 and 612 and a second segment includes the symbol durations 614 and 616. Whereas, the symbol durations 602, 604, 606, and 608 are not assigned for the CSI-RS transmission. The UE 102 can transmit the CSI-RSs repeatedly in the symbol durations 610, 612, 614, and 616 to the UE 106 and/or the UE 108. Repeat CSI-RSs transmissions can improve the accuracy of the radio channels measurement of the side-links 116 and/or 118. In some aspects, the symbol durations 610, 612, 614, and 616 are assigned by a base station, such as the base station 104. The base station 104 generates a configuration message that indicates the symbol durations 610, 612, 614, and 616. For example, the configuration message can include a symbol time parameter, such as a firstOFDMSymbolInTimeDomain parameter, a segment number, a segment volume, and a gap number. The symbol time parameter indicates the first assigned symbol duration, such as the symbol duration 610. The segment number indicates the number of segments the CSI-RSs transmission is repeated. The example 600 includes two segments. The segment volume indicates the number of symbol durations included in each segment. Each segment includes two symbol durations in the example 600. The gap number indicates the number of symbol durations that are not assigned between two segments. Example 600 shows four symbol durations between the first and the second segments. In some aspects, the gap between the first and second segments provides an extend coverage of the CSI-RSs transmission to at least eight symbol durations using four assigned symbol durations. Alternatively, the gap number is limited by a transmit/reception phase continuity condition of the UE 102. For example, the UE 102 can be assigned with a gap number N if the UE 102 can keep the transmit/reception phase continuity within N symbol durations. The assignment of the gap number N can also determine based on the number of assigned symbol durations. The base station 104 can transmit the configuration message to the UE 102 via the communication link 110. The base station 104 can also transmit the configuration message, directly or indirectly through the UE 102, to other UEs that receive the CSI-RSs transmission, such as the UE 106 and/or the UE 108.

Similar to the discussion of FIG. 5, the symbol durations 610, 612, 614, and 616 can be used to support the CSI-RSs transmission of one antenna port of a UE, multiple antenna ports of a UE, or multiple receiving UEs. For example, the symbol durations 610, 612, 614, and 616 can be shared by multiple antenna ports of a UE or multiple receiving UEs by applying OCCs to CSI-RSs. In addition, the symbol durations 610, 612, 614, and 616 can be combined with the subcarrier assignments 402, 404, 406, and 408 discussed in FIG. 4.

Figure 7:
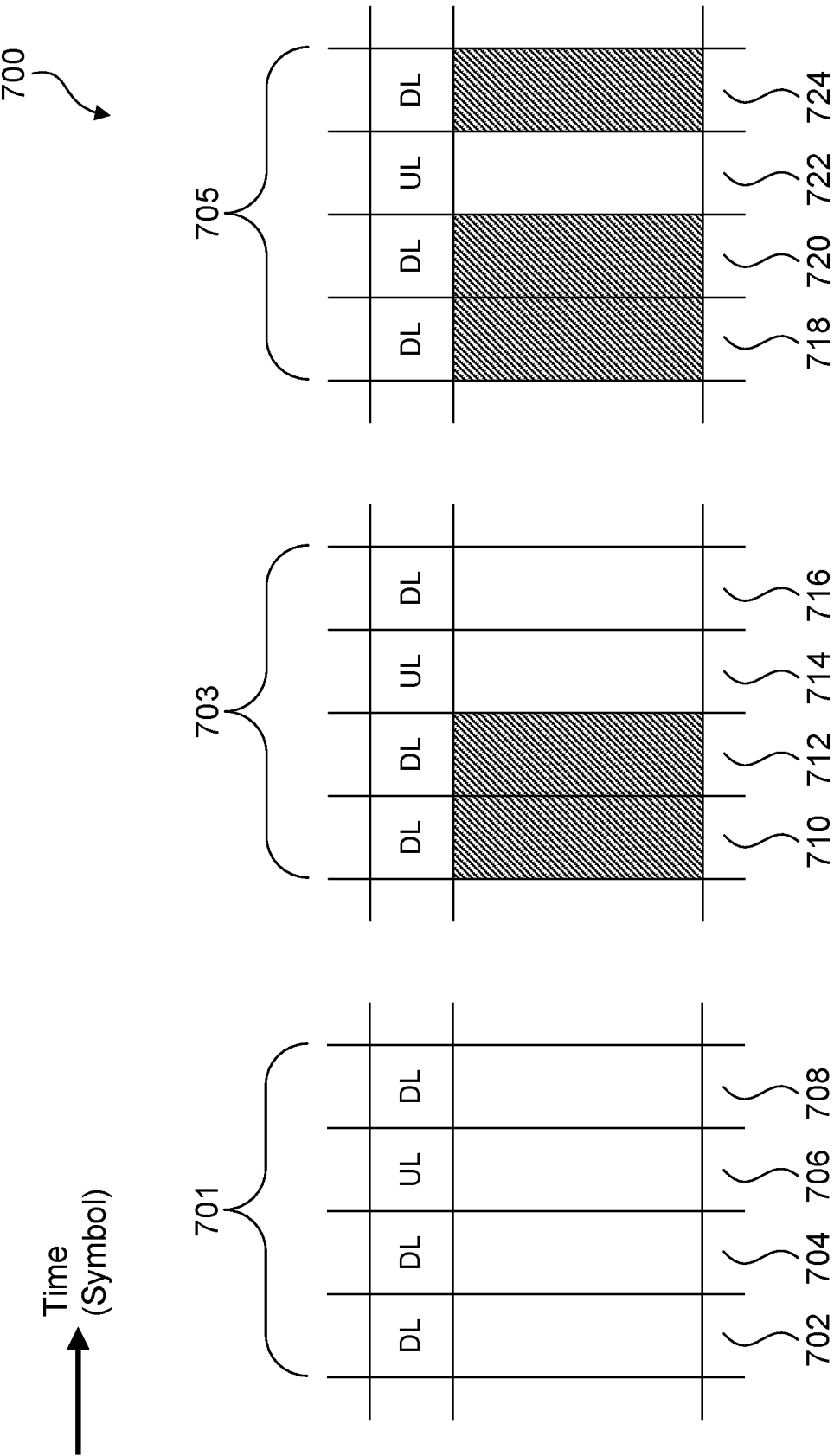
FIG. 7 illustrates an example of the enhanced side-link resource assignment with conflicting events, according to aspects of the disclosure.

FIG. 7 illustrates an example 700 of the enhanced side-link resource assignment with conflicting events. The example 700 is provided for the purpose of illustration only and does not limit the disclosed aspects. The example 700 includes three scenarios of UE reactions to conflict events.

In the first scenario 701, similarly to FIG. 5, a UE is assigned with four consecutive symbol durations 702, 704, 706, and 708 for the CSI-RSs transmission in a side-link. For example, the UE 102 is assigned with these consecutive symbol durations for the CSI-RSs transmission via the side-link 116 to the UE 106. In some aspects, the UE 102 expects a change of transmit/receive direction in the symbol duration 706. Specifically, the UE 102 expects to transmit to the UE 106 in the symbol durations 702, 704, and 708 as DL transmissions and expects to receive from the UE 106 in the symbol duration 706 as a UL receiving. Therefore, the CSI-RSs transmission assignment of the symbol duration 706 conflicts with its transmit/receive direction. In such a case, the UE 102 can cancel the CSI-RSs transmission on all four consecutive symbol durations 702, 704, 706, and 708 to avoid the conflict. The UE 102 can transmit other data using the symbol durations 702, 704, and 708.

In the second scenario 703, the UE 102 is also assigned with four consecutive symbol durations 710, 712, 714, and 716 for the CSI-RSs transmission in the side-link 116 but expects a change of transmit/receive direction in the symbol duration 714. The UE 102 can transmit the CSI-RSs in the symbol durations until the change of transmit/receive direction. For example, the UE 102 can transmit the CSI-RSs in the symbol durations 710 and 712, but can stop transmitting the CSI-RSs starting from the symbol duration 714. Therefore, the symbol duration 716 is not used for the CSI-RSs transmission because the CSI-RSs transmission stops at the symbol duration 714. The UE 102 can transmit other data using the symbol duration 716.

In the third scenario 705, the UE 102 is also assigned with four consecutive symbol durations 718, 720, 722, and 724 for the CSI-RSs transmission in the side-link 116 but expects a change of transmit/receive direction in the symbol duration 722. The UE 102 can transmit the CSI-RSs in the assigned symbol durations except during the change of transmit/receive direction. For example, the UE 102 can transmit the CSI-RSs in the symbol durations 718, 720, and 724, but can refrain from transmitting the CSI-RSs in the symbol duration 722. In some aspects, the UE 102 can indicate to the UE 106 whether the UE 106 can assume that the phase continuity can be maintained between two non-consecutive symbol durations with an intercepting symbol duration that changes the transmit/receive direction. For example, the UE 102 can transmit an indicator to the UE 106 indicating whether the phase continuity can be maintained between the symbol durations 720 and 724.

Figure 8:
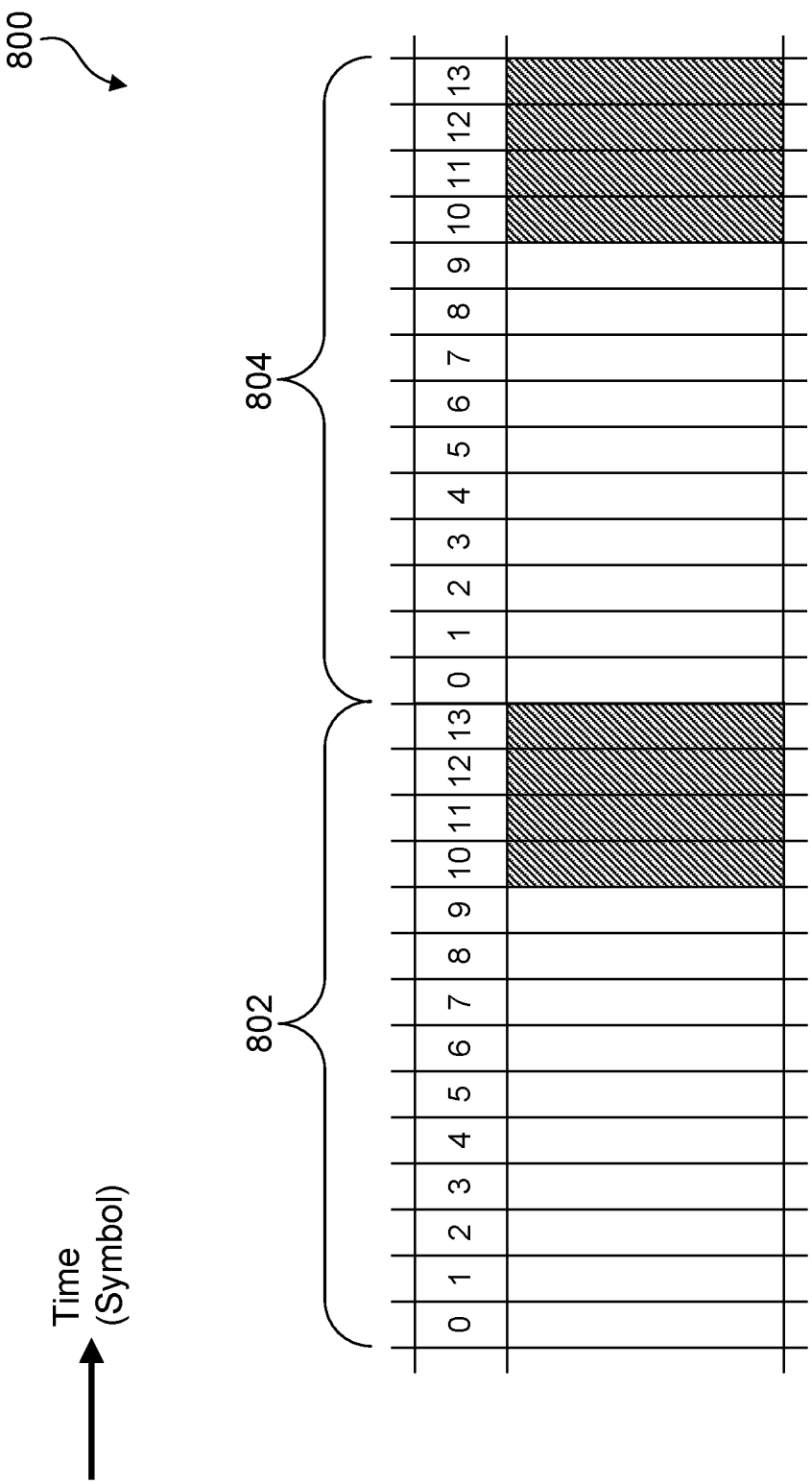
FIG. 8 illustrates an example of the enhanced side-link resource assignment in multiple slots, according to aspects of the disclosure.

FIG. 8 illustrates an example 800 of the enhanced side-link resource assignment in multiple slots. The example 800 is provided for the purpose of illustration only and does not limit the disclosed aspects. The example 800 includes assigned symbol durations for the CSI-RSs transmission in multiple slots. For example, the four symbol durations are assigned in each of slots 802 and 804.

In some aspects, a UE, such as the UE 102, can transmit the CSI-RSs in all the assigned symbol durations in the slots 802 and 804. In some a case, the UE 102 can indicate to the UE 106 whether the UE 106 can assume that the phase continuity can be maintained between symbol durations in different slots. For example, the UE 102 can transmit an indicator to the UE 106 indicating whether the phase continuity can be maintained between the four assigned symbol durations in the slot 802 and the four assigned symbol durations in the slot 804.

In some aspects, the UE 102 can transmit the CSI-RSs in the four assigned symbol durations in the slot 802, but refrain from transmitting the CSI-RSs in the four assigned symbol durations in the slot 804 for various reasons. For example, the UE 102 can determine that the phase continuity cannot be maintain between different slots, such as the slots 802 and 804. For another example, the UE 102 can determine to transmit data in the slot 804 instead of reference signals, such as the CSI-RSs.

Figure 9:
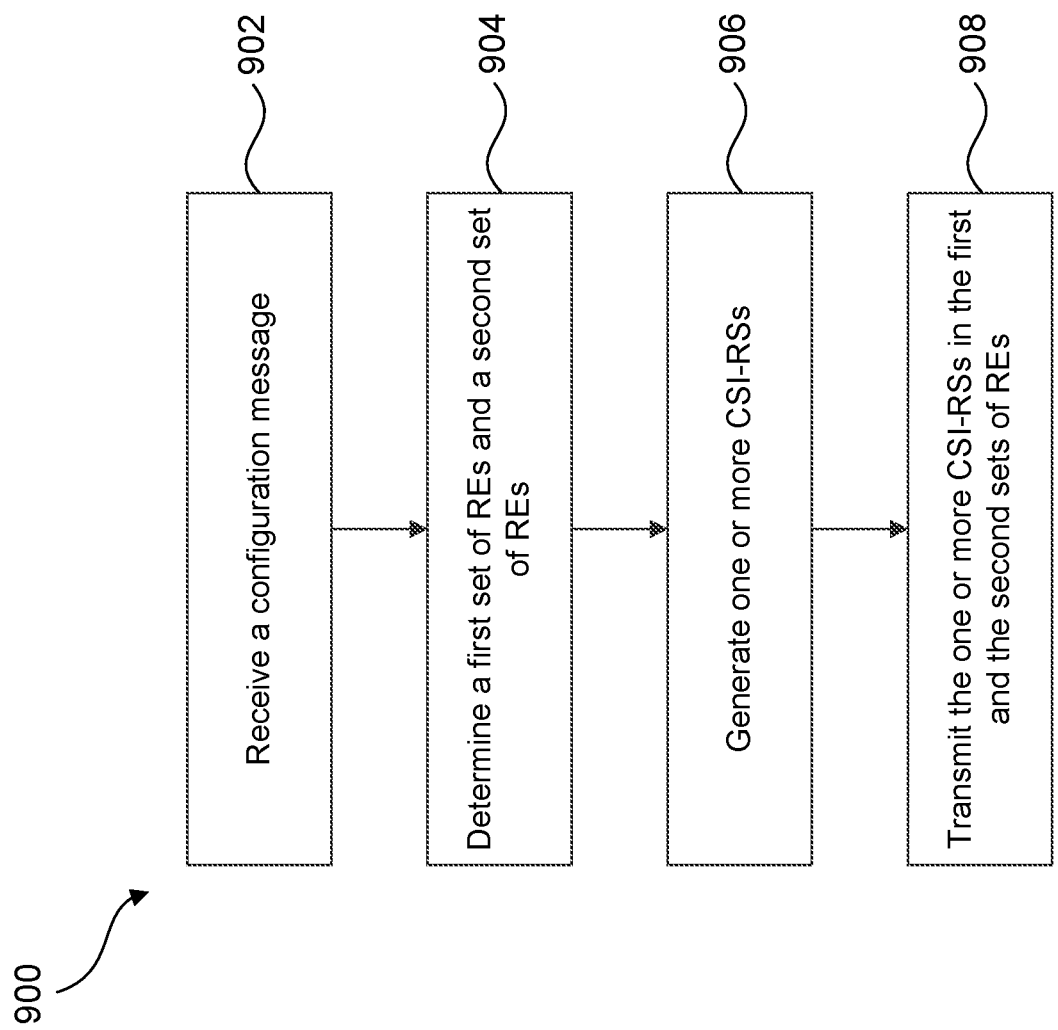
FIG. 9 illustrates an example method of transmitting channel state information reference signals (CSI-RSs) using enhance resources, according to aspects of the disclosure.

FIG. 9 illustrates an example method 900 of transmitting CSI-RSs using enhance resources. The example method 900 is provided for the purpose of illustration only and does not limit the disclosed aspects. As a convenience and not a limitation, FIG. 9 may be described with regard to elements of FIGS. 1, 2, and 11. The example method 900 may represent the operation of electronic devices (for example, the UEs 102, 106, 108, and the base station 104 of FIG. 1) implementing the CSI enhancement. The example method 900 may also be performed by electronic device 200 of FIG. 2, controlled or implemented by processor 210, and/or computer system 1100 of FIG. 11. But the example method 900 is not limited to the specific aspects depicted in those figures and other systems may be used to perform the method, as will be understood by those skilled in the art. It is to be appreciated that not all operations may be needed, and the operations may not be performed in the same order as shown in FIG. 9.

At 902, the UE 102 receives a configuration message from a base station, such as the base station 104. In some aspects, the UE 102 receives the configuration message via a higher-layer signaling, such as a radio resource control (RRC) transmission. The UE 102 can also receive the configuration message from another UE. In some aspects, the UE 102 can also determine the configuration message independently instead of receiving it from other devices. For example, the UE 102 can determine the configuration message based on data to be transmitted, current or past radio channel conditions of communication links such as the side-links 116 and 118, or other information available to the UE 102.

At 904, the UE 102 determines a first and a second sets of REs. In some aspects, each RE of the first and the second set occupies a frequency bandwidth and a time period. Therefore, the UE 102 determines subcarriers and time durations of each RE of the first and the second set. In some aspects, the first set of REs is assigned to one antenna port, such as the first antenna port of the UE 102, and the second set of REs is assigned to another antenna port, such as the second antenna port of the UE 102. The UE 102 can determine the subcarrier of each RE based on the subcarriers assignments 302 and 304 of FIG. 3 and the subcarriers assignments 402, 404, 406, and 408 of FIG. 4. For example, as described in 404 of FIG. 4, the REs r(0), r(2), r(4), r(6), r(8), and r(10) can represent the first set of REs because they are assigned to the first antenna of the UE 102. Similarly, the REs r(1), r(3), r(5), r(7), r(9), and r(11) can represent the second set of REs because they are assigned to the second antenna of the UE 102. The UE 102 can also determine the time period of each RE based on the symbol durations described in FIGS. 5-8. For example, as FIG. 5 describes, the symbol durations 502, 504, 506, and 508 can be assigned to both the first antenna port and the second antenna port of the UE 102. In such a case, the symbol durations 502, 504, 506, and 508 can represent time periods of both the first and second sets of REs.

At 906, the UE 102 generates one or more CSI-RSs. The one or more CSI-RSs can be transmitted by one antenna port of the UE 102 to another UE, such as the UE 106. The one or more CSI-RSs can also correspond to multiple antenna ports of the UE 102 or multiple receiving UEs. In such a case, similar to the discussion of FIG. 5, OCCs are applied to the one or more CSI-RSs to distinguish the CSI-RSs corresponding to different antenna ports or receiving UEs.

At 908, the UE 102 can transmit the one or more CSI-RSs in the first and the second sets of REs via the first and the second antenna ports of the UE 102 respectively. The UE 102 can also transmit the one or more CSI-RSs to multiple receiving UEs, such as the UE 106 and the UE 108, as described in FIG. 5.

Figure 10:
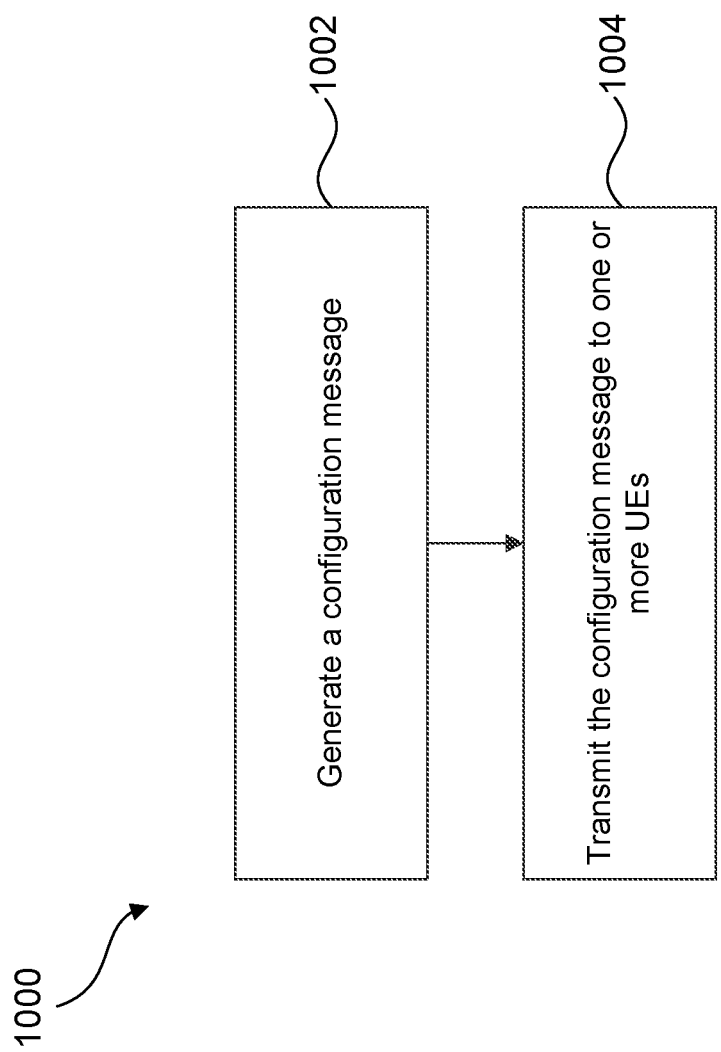
FIG. 10 illustrates an example method of configuring the enhanced resources for transmitting the CSI-RSs, according to aspects of the disclosure.

FIG. 10 illustrates an example method 1000 of configuring the enhanced resources for transmitting the CSI-RSs. The example method 1000 is provided for the purpose of illustration only and does not limit the disclosed aspects. As a convenience and not a limitation, FIG. 10 may be described with regard to elements of FIGS. 1, 2, and 11. The example method 1000 may represent the operation of electronic devices (for example, the UEs 102, 106, 108, and the base station 104 of FIG. 1) implementing the CSI enhancement. The example method 1000 may also be performed by electronic device 200 of FIG. 2, controlled or implemented by processor 210, and/or computer system 1100 of FIG. 11. But the example method 1000 is not limited to the specific aspects depicted in those figures and other systems may be used to perform the method, as will be understood by those skilled in the art. It is to be appreciated that not all operations may be needed, and the operations may not be performed in the same order as shown in FIG. 10.

At 1002, the base station 104 generates a configuration message. The configuration message can indicate subcarrier assignments for side-link CSI-RSs transmissions of the UE 102, such as the subcarrier assignments 402, 404, 406, and 408 of FIG. 4. The configuration message can also indicate symbol duration assignment for the side-link CSI-RSs transmissions of the UE 102, such as the example 500 of FIG. 5 and example 600 of FIG. 6. The configuration message can also indicate OCCs that correspond to different antenna ports and/or different receiving UEs as described in FIG. 5. The configuration message can also indicate one or more reactions of the UE 102 to a change of transmit/receipt direction as described in FIG. 7. The configuration message can also indicate whether the UE 102 transmits the CSI-RSs in multiple symbol durations of different slots, such as the slots 802 and 804, described in FIG. 8.

At 1004, the base station 104 transmits the configuration message to one or more UEs. The base station 104 can transmit the configuration message to the UE 102, which retransmits the configuration message to other UEs, such as the UE 106 and UE 108. The base station 104 can also transmit the configuration message to the UEs 106 and 108 directly.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some aspects, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Figure 11:
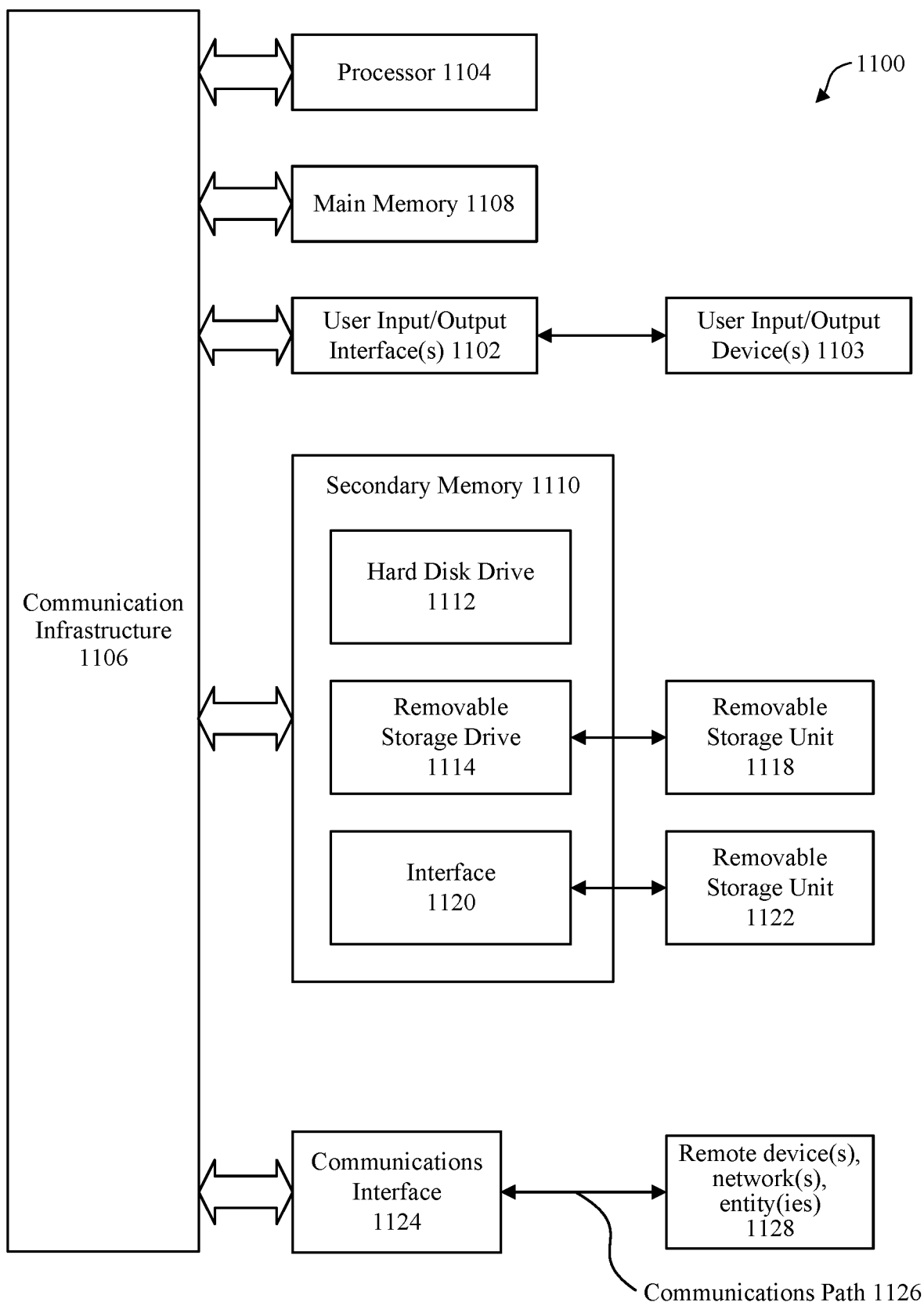
FIG. 11 is an example computer system for implementing some aspects of the disclosure or portion(s) thereof.

Based on the teachings contained in this disclosure, it will be apparent to persons skilled in the relevant art(s) how to make and use aspects of the disclosure using data processing devices, computer systems and/or computer architectures other than that shown in FIG. 11. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver configured to enable wireless communications with a base station and a second UE, wherein the transceiver comprises a first set of antenna ports; and
a processor, communicatively coupled to the transceiver, and configured to:
determine a set of subcarriers from two physical resource blocks (PRBs), wherein the set of subcarriers includes only one subcarrier or more than two subcarriers; and
transmit, using the first set of antenna ports of the transceiver, channel state information reference signals (CSI-RSs) in a set of resource elements (REs) to the second UE, wherein the set of REs occupies the set of subcarriers including only one subcarrier or more than two subcarriers.

2. The UE of claim 1, wherein the processor is further configured to:
determine a plurality of symbol durations for the CSI-RSs signals transmission, wherein the set of REs occupies the plurality of symbol durations.

3. The UE of claim 2, wherein the plurality of symbol durations include:
N consecutive symbol durations, or
M non-consecutive segments, each of which includes K consecutive symbol durations.

4. The UE of claim 2, wherein the processor is further configured to:
generate a first encoded CSI-RS symbol by encoding a first CSI-RS symbol with a first orthogonal cover code;
generate a second encoded CSI-RS symbol by encoding a second CSI-RS symbol with a second orthogonal cover code; and
transmit, using the first set of antenna ports of the transceiver, the CSI-RSs in the set of REs to the second UE and a third UE,
wherein the CSI-RSs include the first encoded CSI-RS symbol and the second encoded CSI-RS symbol.

5. The UE of claim 4, wherein the processor is further configured to:
generate a cover code configuration message that assigns the first orthogonal cover code to the second UE and assigns the second orthogonal cover code to the third UE; and
transmit, using the transceiver, the cover code configuration message to the second UE and the third UE.

6. The UE of claim 1, wherein the transceiver further comprises a second set of antenna ports, wherein the processor is further configured to:
determine a second set of subcarriers from the two PRBs; and
transmit, using the second set of antenna ports of the transceiver, the CSI-RSs in a second set of REs to the second UE, wherein the second set of REs occupies the second set of subcarriers.

7. The UE of claim 1, wherein to determine the set of subcarriers, the processor is further configured to:
receive, using the transceiver, a configuration message from the base station or another UE via a higher layer signaling; and
determine the set of subcarriers based on the configuration message.

8. A user equipment (UE) comprising:
a transceiver configured to enable wireless communications with a base station and a second UE, wherein the transceiver comprise a first set of antenna ports; and
a processor, communicatively coupled to the transceiver, and configured to:
determine a plurality of symbol durations; and
transmit, using the first set of antenna ports of the transceiver, channel state information reference signals (CSI-RSs) in a set of resource elements (REs) to the second UE, wherein the set of REs occupies the plurality of symbol durations.

9. The UE of claim 8, wherein the plurality of symbol durations include:
N consecutive symbol durations, or
M non-consecutive segments, each of which includes K consecutive symbol durations.

10. The UE of claim 8, wherein the processor is further configured to:
generate a first encoded CSI-RS symbol by encoding a first CSI-RS symbol with a first orthogonal cover code;
generate a second encoded CSI-RS symbol by encoding a second CSI-RS symbol with a second orthogonal cover code; and
transmit, using the first set of antenna ports of the transceiver, the CSI-RSs in the set of REs to the second UE and a third UE,
wherein the CSI-RSs include the first encoded CSI-RS symbol and the second encoded CSI-RS symbol.

11. The UE of claim 10, wherein the processor is further configured to:
generate a cover code configuration message that assigns the first orthogonal cover code to the second UE and assigns the second orthogonal cover code to the third UE; and
transmit, using the transceiver, the cover code configuration message to the second UE and the third UE.

12. The UE of claim 8, wherein the processor is further configured to:
determine a set of subcarriers from two physical resource blocks (PRBs),
wherein the set of subcarriers includes only one subcarrier or more than two subcarriers, and
wherein the set of REs occupies the set of subcarriers.

13. The UE of claim 12, wherein the transceiver further comprises a second set of antenna ports, wherein the processor is further configured to:
determine a second set of subcarriers out of the two PRBs; and
transmit, using the second set of antenna ports of the transceiver, the CSI-RSs in a second set of REs to the second UE, wherein the second set of REs occupies the second set of subcarriers.

14. A base station comprising:
a transceiver configured to enable wireless communication with a user equipment (UE); and
a processor, communicatively coupled to the transceiver, and configured to:
generate a configuration message, wherein the configuration message indicates a set of resource elements (REs) for a side-link channel state information reference signal (CSI-RS) transmission between the UE and a second UE, wherein the set of REs occupies a set of subcarriers selected from two physical resource blocks (PRBs), wherein the set of subcarriers includes only one subcarrier or more than two subcarriers; and transmit, using the transceiver, the configuration message to the UE.

15. The base station of claim 14, wherein the set of REs corresponds to a first set of antenna ports of the UE.

16. The base station of claim 15,
wherein the configuration message further indicates a second set of REs for the side-link CSI-RS transmission between the UE and the second UE,
wherein the second set of REs occupies a second set of subcarriers out of the two PRBs, and
wherein the second set of REs corresponds to a second set of antenna ports of the UE.

17. The base station of claim 14, wherein the configuration message further indicates that the set of REs also occupies a plurality of symbol durations.

18. The base station of claim 17, wherein the plurality of symbol durations include:

N consecutive symbol durations, or
M non-consecutive segments, each of which includes K consecutive symbol durations.

19. The base station of claim 14,
wherein the configuration message further indicates a first and a second orthogonal cover codes, and
wherein the side-link CSI-RS transmission includes a first CSI-RS symbol encoded by the first orthogonal cover code and a second CSI-RS symbol encoded by the second orthogonal cover code.

20. The base station of claim 19, wherein the processor is further configured to:
transmit, using the transceiver, the configuration message to a second UE and a third UE,
wherein the configuration message indicates that the first orthogonal cover code corresponds to the second UE and the second orthogonal cover code corresponds to the third UE.

* * * * *